US010602400B2

(12) United States Patent
Malkamäki et al.

(10) Patent No.: US 10,602,400 B2
(45) Date of Patent: Mar. 24, 2020

(54) ENHANCEMENT OF PDCP STATUS REPORT (71) Applicant: Nokia Solutions and Networks Oy, Espoo (FI)

(72) Inventors: Esa Malkamäki, Espoo (FI); Henri Koskinen, Espoo (FI); Benoist Sebire, Tokyo (JP); Mika Rinne, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 135 days.

(21) Appl. No.: 15/761,182

(22) PCT Filed: Sep. 23, 2016

(86) PCT No.: PCT/FI2016/050659
§ 371 (c)(1),
(2) Date: Mar. 19, 2018

(87) PCT Pub. No.: WO2017/051076
PCT Pub. Date: Mar. 30, 2017

(65) Prior Publication Data
US 2018/0262950 A1    Sep. 13, 2018

Related U.S. Application Data (60) Provisional application No. 62/232,632, filed on Sep. 25, 2015.

(51) Int. Cl.
H04W 28/06    (2009.01)
H04W 24/10    (2009.01)
(Continued)

(52) U.S. Cl.
CPC .......... H04W 28/06 (2013.01); H04L 1/1614 (2013.01); H04L 1/1621 (2013.01);
(Continued)

(58) Field of Classification Search
CPC ... H04L 1/1614; H04L 1/1621; H04L 1/1628; H04W 28/06; H04W 24/10
See application file for complete search history.

(56) References Cited

U.S. PATENT DOCUMENTS 8,526,440 B2   9/2013   Ho et al.
8,526,449 B2   9/2013   Rugel
8,824,376 B2   9/2014   Chun et al.
9,014,010 B2   4/2015   Yi et al.
(Continued)

FOREIGN PATENT DOCUMENTS

WO    2014/025141 A1    2/2014

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS 36.300, V12.5.0, Mar. 2015, pp. 1-251.

(Continued)

Primary Examiner — Edan Orgad
Assistant Examiner — Nourali Mansoury
(74) Attorney, Agent, or Firm — Harrington & Smith (57) ABSTRACT A method includes determining that a full PDCP status report does not fit into a single PDCP Control PDU, generating a partial PDCP status report that fits into the single PDCP Control PDU, and sending the single PDCP Control PDU containing the partial PDCP status report. Another method includes receiving a PDCP Control PDU where the maximum size thereof is limited, and determining that the received PDCP Control PDU contains a partial PDCP status report instead of a complete PDCP status report. Apparatus, program products, programs, UEs, base stations, and a communication system are also disclosed.

16 Claims, 7 Drawing Sheets (51) Int. Cl.
*H04L 1/16* (2006.01)
*H04L 12/26* (2006.01)

(52) U.S. Cl.
CPC ........... *H04L 1/1628* (2013.01); *H04W 24/10* (2013.01); *H04L 43/08* (2013.01)

(56) References Cited

U.S. PATENT DOCUMENTS

| | | | |
|---|---|---|---|
| 2009/0103445 A1 | 4/2009 | Sammour | |
| 2009/0238142 A1 | 9/2009 | Chun et al. | |
| 2010/0110971 A1* | 5/2010 | Kim | H04L 1/1614 370/315 |
| 2010/0215020 A1* | 8/2010 | Lee | H04L 1/1614 370/331 |
| 2011/0228746 A1* | 9/2011 | Chun | H04W 28/06 370/331 |
| 2012/0040621 A1 | 2/2012 | Jung et al. | |
| 2013/0272203 A1 | 10/2013 | Chun et al. | |
| 2015/0146617 A1* | 5/2015 | Park | H04W 24/10 370/328 |
| 2015/0271726 A1* | 9/2015 | Kim | H04W 36/0055 370/329 |
| 2017/0257780 A1* | 9/2017 | Ryoo | H04W 16/28 |
| 2018/0124642 A1* | 5/2018 | Phuyal | H04W 28/08 |

OTHER PUBLICATIONS

"3rd Generation Partnership Project; Technical Specification Group Radio Access Network; Evolved Universal Terrestrial Radio Access (E-UTRA); Packet Data Convergence Protocol (PDCP) specification (Release 12)", 3GPP TS 36.323, V12.4.0, Jun. 2015, pp. 1-33.

"3rd Generation Partnership Project; Technical Specification Group Radio Access Network; Evolved Universal Terrestrial Radio Access (E-UTRA); Radio Link Control (RLC) protocol specification (Release 12)", 3GPP TS 36.322, V12.2.0, Mar. 2015, pp. 1-40.

"User Plane Status Reports in LTE", TSG-RAN Working Group 2 meeting #59, R2-073225, Agenda: 5.2.3, Ericsson, Aug. 20-24, 2007, 2 pages.

"PDCP Status Report Format", 3GPP TSG-RAN Working Group 2 meeting #59bis, R2-074124, Agenda: 5.1.3.4, LG Electronics Inc, Oct. 8-12, 2007, pp. 1-2.

"PDCP Status PDU with PDCP SN Extension", 3GPP TSG-RAN Working Group 2 meeting #91bis, R2-15XXXX, Agenda: 7.2.3.1, Nokia Networks, Oct. 5-9, 2015, 3 pages.

"3rd Generation Partnership Project; Technical Specification Group Core Network and Terminals; Mobile Station—Serving GPRS Support Node (MS-SGSN); Logical Link Control (LLC) layer specification (Release 13)", 3GPP TS 44.064, V13.1.0, Jun. 2016, pp. 1-67.

Extended European Search Report received for corresponding European Patent Application No. 16848202.4, dated Feb. 28, 2019, 8 pages.

"Report of email discussion [91bis#25][LTE/CAenh] PDCP control PDU", 3GPP TSG-RAN Working Group 2 meeting #92, R2-156672, Agenda: 7.2.3.1, Nokia Networks, Nov. 16-20, 2015, 8 pages.

International Search Report and Written Report received for corresponding Patent Cooperation Treaty Application No. PCT/FI2016/050659, dated Jan. 11, 2017, 23 pages.

European Office Action, Application No, 16 848 202.4 dated Jan. 28, 2020, 5 pages.

* cited by examiner

(Prior Art)

FIG. 2B

(Prior Art)

| D/C | PDU Type | S=1 | E=0 | R | R | Oct 1 |
| R | FMS ||||| Oct 2 |
| FMS (cont.) |||||| Oct 3 |
| FMS (cont.) |||||| Oct 4 |
| Bitmap$_1$ (optional) |||||| Oct 5 |
| ... |||||| |
| Bitmap$_{N\_MAX}$ (optional) |||||| Oct 4+N_MAX |
| Number of correctly received PDUs after this segment |||||| Oct 4+N_MAX |
| Number of correctly received PDUs after this segment (cont.) |||||| Oct 4+N_MAX |
| Number of correctly received PDUs after this segment (cont.) |||||| Oct 4+N_MAX |

FIG. 4

| D/C | PDU Type | R | R | R | R | Oct 1 |
|---|---|---|---|---|---|---|
| R | FMS | | | | | Oct 2 |
| FMS (cont.) | | | | | | Oct 3 |
| FMS (cont.) | | | | | | Oct 4 |
| R | Bitmap starting SN | | | | | Oct 5 |
| Bitmap starting SN (cont.) | | | | | | Oct 6 |
| Bitmap starting SN (cont.) | | | | | | Oct 7 |
| Bitmap$_1$ (optional) | | | | | | Oct 8 |
| ... | | | | | | |
| Bitmap$_{N\_MAX}$ (optional) | | | | | | Oct 7+N_MAX |

ENHANCEMENT OF PDCP STATUS REPORT

RELATED APPLICATION

This application was originally filed as PCT Application No. PCT/FI2016/050659 filed Sep. 23, 2016 which claims priority benefit from U.S. Application No. 62/232,632 filed Sep. 25, 2015.

TECHNICAL FIELD

This invention relates generally to PDCP Status Reports (or Status PDUs), which are exchanged between a UE and eNB and, more specifically, relates to the extension of the PDCP SN.

BACKGROUND

In the Third Generation Partnership Project (3GPP) and in the 3GPP Long-Term Evolution (LTE) system, there exists a PDCP layer in the air interface protocol stack of User Equipment (UE) and evolved NodeB (eNB). Due to re-establishment at lower layers, some PDCP packets can be lost, so on those bearers which are mapped to RLC AM, the data-receiving PDCP entity sends PDCP Control PDU or PDCP status report so the peer PDCP entity can re-transmit those missing packets towards the receiver.

Thus, 3GPP LTE Packet Data Convergence Protocol (PDCP) Status Reports are exchanged between UE and eNB. The PDCP specification 3GPP TS 36.323 at the time of the current invention discusses PDCP Status Reports in Section 5.3.

Regarding the transmit operation, section 5.3.1 states that when upper layers request a PDCP re-establishment, for radio bearers that are mapped on RLC AM, the UE shall, if the radio bearer is configured by upper layers to send a PDCP status report in the uplink (statusReportRequired), then compile a status report after processing the PDCP Data PDUs that are received from lower layers due to the re-establishment of the lower layers as specified in subclause 5.2.2.1 and submit it to lower layers as the first PDCP PDU for the transmission, by (1) setting the FMS field to the PDCP SN of the first missing PDCP SDU;

(2) if there is at least one out-of-sequence PDCP SDU stored, then allocating a Bitmap field of length in bits equal to the number of PDCP SNs from and not including the first missing PDCP SDU up to and including the last out-of-sequence PDCP SDUs, rounded up to the next multiple of 8;

(3) setting as '0' in the corresponding position in the bitmap field for all PDCP SDUs that have not been received as indicated by lower layers, and optionally PDCP SDUs for which decompression have failed;

(4) indicating in the bitmap field as '1' for all other PDCP SDUs.

Regarding the receive operation, section 5.3.2 states that when a PDCP status report is received in the downlink, for radio bearers that are mapped on RLC AM for each PDCP SDU, if any, with the bit in the bitmap set to '1', or with the associated COUNT value less than the COUNT value of the PDCP SDU identified by the FMS field, the successful delivery of the corresponding PDCP SDU is confirmed and the UE shall then process the PDCP SDU as specified in subclause 5.4.

PDCP Control PDU for PDCP status report is discussed in section 6.2.6. Also of interest are RLC status PDU in 36.322, contributions on PDCP Status report for Rel-8, e.g., R2-073225 (Ericsson, "User Plane Status Reports in LTE", TSG-RAN WG2 Meeting #59, Athens, Greece, Aug. 20-24, 2007) and R2-074124 (LG Electronics Inc., "PDCP Status Report Format", 3GPP TSG-RAN WG2#59 bis, Shanghai, China, 8 Oct.-12 Oct. 2007).

Extension of PDCP SN, for instance, to 23 bits would mean that problems could develop due to this larger bit size.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, after the detailed description section.

BRIEF SUMMARY

This section is intended to include examples and the examples are non-limiting.

In an exemplary embodiment, a method is disclosed that comprises determining that a full PDCP status report does not fit into a single PDCP Control PDU, and generating a partial PDCP status report that fits into the single PDCP Control PDU. The method also comprises sending the single PDCP Control PDU containing the partial PDCP status report.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An exemplary apparatus includes one or more processors and one or more memories including computer program code. The one or more memories and the computer program code are configured to, with the one or more processors, cause the apparatus to perform at least the following: determining that a full PDCP status report does not fit into a single PDCP Control PDU; generating a partial PDCP status report that fits into the single PDCP Control PDU; and sending the single PDCP Control PDU containing the partial PDCP status report.

An exemplary computer program product includes a computer-readable storage medium bearing computer program code embodied therein for use with a computer. The computer program code includes: code for determining that a full PDCP status report does not fit into a single PDCP Control PDU; code for generating a partial PDCP status report that fits into the single PDCP Control PDU; and code for sending the single PDCP Control PDU containing the partial PDCP status report.

In another exemplary embodiment, an apparatus comprises: means for determining that a full PDCP status report does not fit into a single PDCP Control PDU; generating a partial PDCP status report that fits into the single PDCP Control PDU; and sending the single PDCP Control PDU containing the partial PDCP status report.

In a further exemplary embodiment, a method comprises receiving a PDCP Control PDU where the maximum size thereof is limited, and determining that the received PDCP Control PDU contains a partial PDCP status report instead of a complete PDCP status report.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An exemplary apparatus includes one or more processors and one or more memories including computer program code. The one or more memories and the computer program code are configured to, with the one or more processors, cause the apparatus to perform at least the following: receiving a PDCP Control PDU where the maximum size thereof is limited; and determining that the received PDCP Control PDU contains a partial PDCP status report instead of a complete PDCP status report.

An exemplary computer program product includes a computer-readable storage medium bearing computer program code embodied therein for use with a computer. The computer program code includes: code for receiving a PDCP Control PDU where the maximum size thereof is limited; code for determining that the received PDCP Control PDU contains a partial PDCP status report instead of a complete PDCP status report.

An additional exemplary embodiment is an apparatus comprising: means for receiving a PDCP Control PDU where the maximum size thereof is limited; and means for determining that the received PDCP Control PDU contains a partial PDCP status report instead of a complete PDCP status report.

An additional exemplary embodiment is a user equipment comprising any of the apparatus as described above or herein. Another exemplary embodiment is a base station comprising any of the apparatus as described above or herein. Another exemplary embodiment is a communications system comprising the apparatus as described above or herein, such as the user equipment and the base station described in this paragraph.

DETAILED DESCRIPTION OF THE DRAWINGS

Packet Data Convergence Protocol (PDCP) is one of the User plane protocols in LTE. It is present in the UE and eNodeB. This protocol sends and receives packets to and from the UE and eNodeB over the air interface. This protocol works along with other L2 protocols RLC (Radio Link Control) and MAC (Medium Access Control).

The PDCP layer works on top of RLC and in the eNB it transfers the UPLINK packets to the GTP layer which in turn tunnels the packets to core network (Evolved Packet Core—EPC). The PDCP layer in the eNB receives the downlink packets from the GTP layer and sends them onto RLC which in turn sends them to the UE (through MAC and PHY layers). That is, the PDCP layer sits in between RLC and GTP layers. A PDCP status report message is used in a handover process to minimize duplicate transmissions. This message is utilized for retransmitting missing SDUs (service data units) after handover takes place when transmitting data streams using RLC acknowledged mode.

During the handover, there is risk of packet data loss. To manage data loss, each SDU is stored by the PDCP in a re-transmission buffer until confirmed by RLC that the SDU has been completely received. During the handover, an X2-AP SN Status Transfer message from the old eNB to the new eNB sends the information about correct and out of sequence uplink PDUs and unacknowledged downlink PDUs.

The new eNB then can send the PDCP control PDU called PDCP Status Report to the UE and it contains a bitmap telling which of the sequence numbers were correctly received by the old eNB. The UE deletes these sequence numbers in its re-transmission buffer and resends other PDUs. The UE also sends (if configured to send) the PDCP Status Report to the new eNB informing the sequence numbers it has received and so the new eNB deletes these in its re-transmission buffer and re-transmits other PDUs.

This report relates to LTE-A and for example can specifically be applied to the developments in carrier aggregation and the higher data rates being standardized in LTE-A at the time of the invention.

As discussed herein, higher data rates require a longer PDCP sequence number (SN) length. RAN2 has decided to specify a new PDCP SN length in addition to the currently supported 15 bits. In particular, a longer (e.g., 23 bit) SN length has been proposed and tentatively agreed to. However, with a longer (e.g., 23 bit) SN the PDCP Control PDU for the PDCP status report has to be updated. For example, the FMS (first missing PDCP SDU) field has to be extended to more bits (e.g., 23 bits) and a maximum size of the bitmap grows to over 4 million bits (e.g., assuming 23 bits are used).

The exemplary embodiments herein describe techniques for enhancement of PDCP Status report. Additional description of these techniques is presented after a system into which the exemplary embodiments may be used is described.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Figure 1:
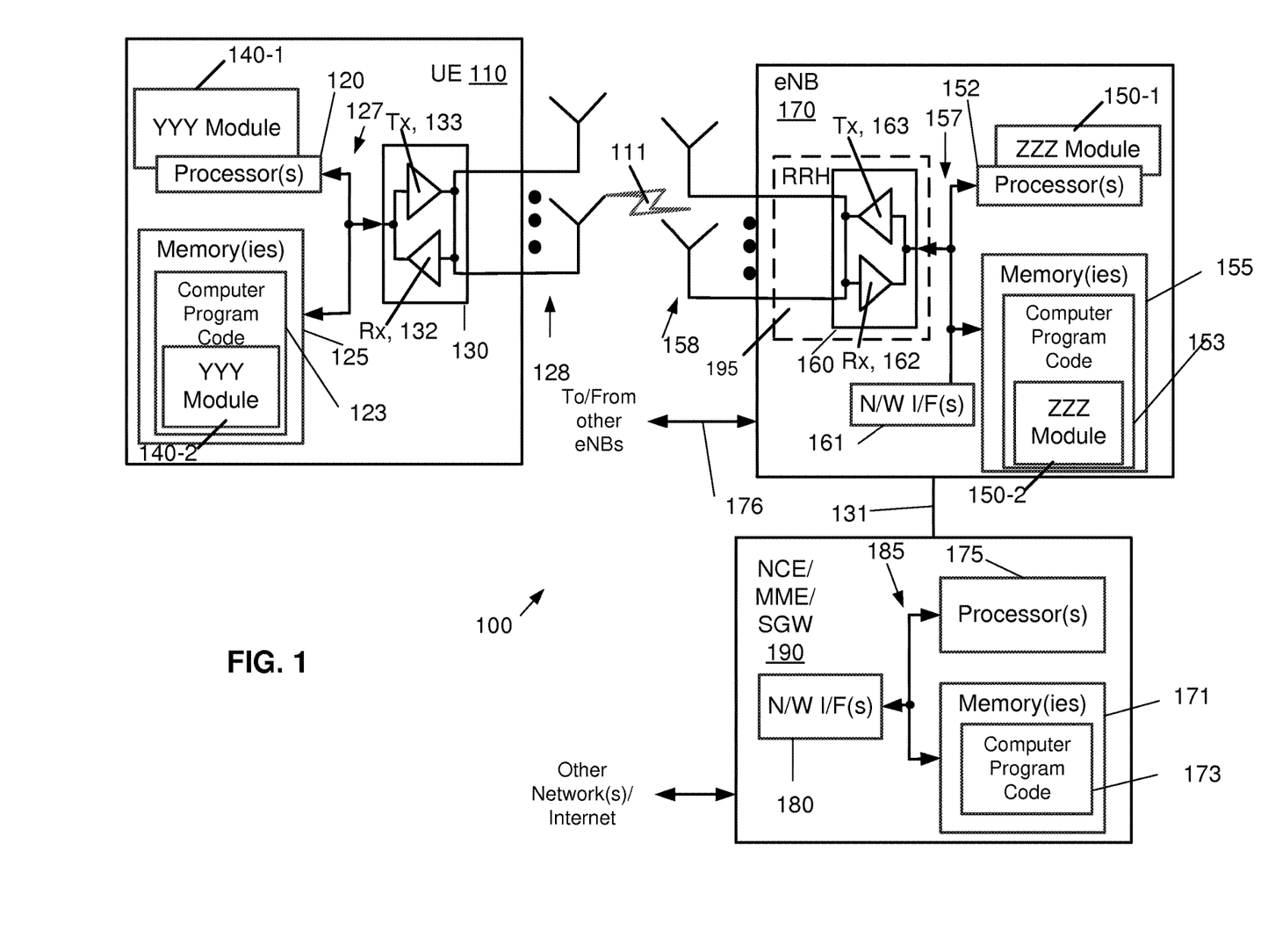
FIG. 1 is a block diagram of one possible and non-limiting exemplary system in which the exemplary embodiments may be practiced.

Turning to FIG. 1, this figure shows a block diagram of one possible and non-limiting exemplary system in which the exemplary embodiments may be practiced. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. Note that the YYY module 140 allows functionality for the Enhancement of PDCP Status report where any method or examples of such embodiments discussed herein can be practiced. The UE 110 includes a YYY module 140, comprising one of or both parts 140-1 and/or 140-2, which may be implemented in a number of ways. The YYY module 140 may be implemented in hardware as YYY module 140-1, such as being implemented as part of the one or more processors 120. The YYY module 140-1 may be implemented also as an integrated circuit or through other hardware such as a programmable gate array. In another example, the YYY module 140 may be implemented as YYY module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with eNB 170 via a wireless link 111.

The eNB (evolved NodeB) 170 is a base station (e.g., for LTE, long term evolution) that provides access by wireless devices such as the UE 110 to the wireless network 100. The eNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. Note that the ZZZ module 150 allows functionality for the Enhancement of PDCP Status reports where any method or examples of such embodiments discussed herein can be practiced. The eNB 170 includes a ZZZ module 150, comprising one of or both parts 150-1 and/or 150-2, which may be implemented in a number of ways. The ZZZ module 150 may be implemented in hardware as ZZZ module 150-1, such as being implemented as part of the one or more processors 152. The ZZZ module 150-1 may be implemented also as an integrated circuit or through other hardware such as a programmable gate array. In another example, the ZZZ module 150 may be implemented as ZZZ module 150-2, which is implemented as computer program code 153 and is executed by the one or more processors 152. For instance, the one or more memories 155 and the computer program code 153 are configured to, with the one or more processors 152, cause the eNB 170 to perform one or more of the operations as described herein. The one or more network interfaces 161 communicate over a network such as via the links 176 and 131. Two or more eNBs 170 communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the eNB 170 being physically in a different location from the RRH, and the one or more buses 157 could be implemented in part as fiber optic cable to connect the other elements of the eNB 170 to the RRH 195.

It is noted that description herein indicates that "cells" perform functions, but it should be clear that the eNB that forms the cell would perform the functions. The cell makes up part of an eNB. That is, there can be multiple cells per eNB. For instance, there could be three cells for a single eNB carrier frequency and associated bandwidth, each cell covering one-third of a 360-degree area so that the single eNB's coverage area covers an approximate oval or circle. Furthermore, each cell can correspond to a single carrier and an eNB may use multiple carriers. So if there are three 120-degree cells per carrier and two carriers, then the eNB has a total of 6 cells.

The wireless network 100 may include a network control element (NCE) 190 that may include MME (Mobility Management Entity)/SGW (Serving Gateway) functionality, and which provides connectivity with a further network, such as a telephone network and/or a data communications network (e.g., the Internet). The eNB 170 is coupled via a link 131 to the NCE 190. The link 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization may still be implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, eNB 170, and other functions as described herein.

In general, the various embodiments of the user equipment 110 can include, but are not limited to, cellular phones such as smart devices, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, internet appliances permitting wireless Internet access and browsing, tablets with wireless communication capabilities, as well as portable units or terminals that incorporate combinations of such functions. In addition, various embodiments of the user equipment include machines, communicators and categories of equipment, which are not primarily or not at all in use by human interaction.

Figure 6:
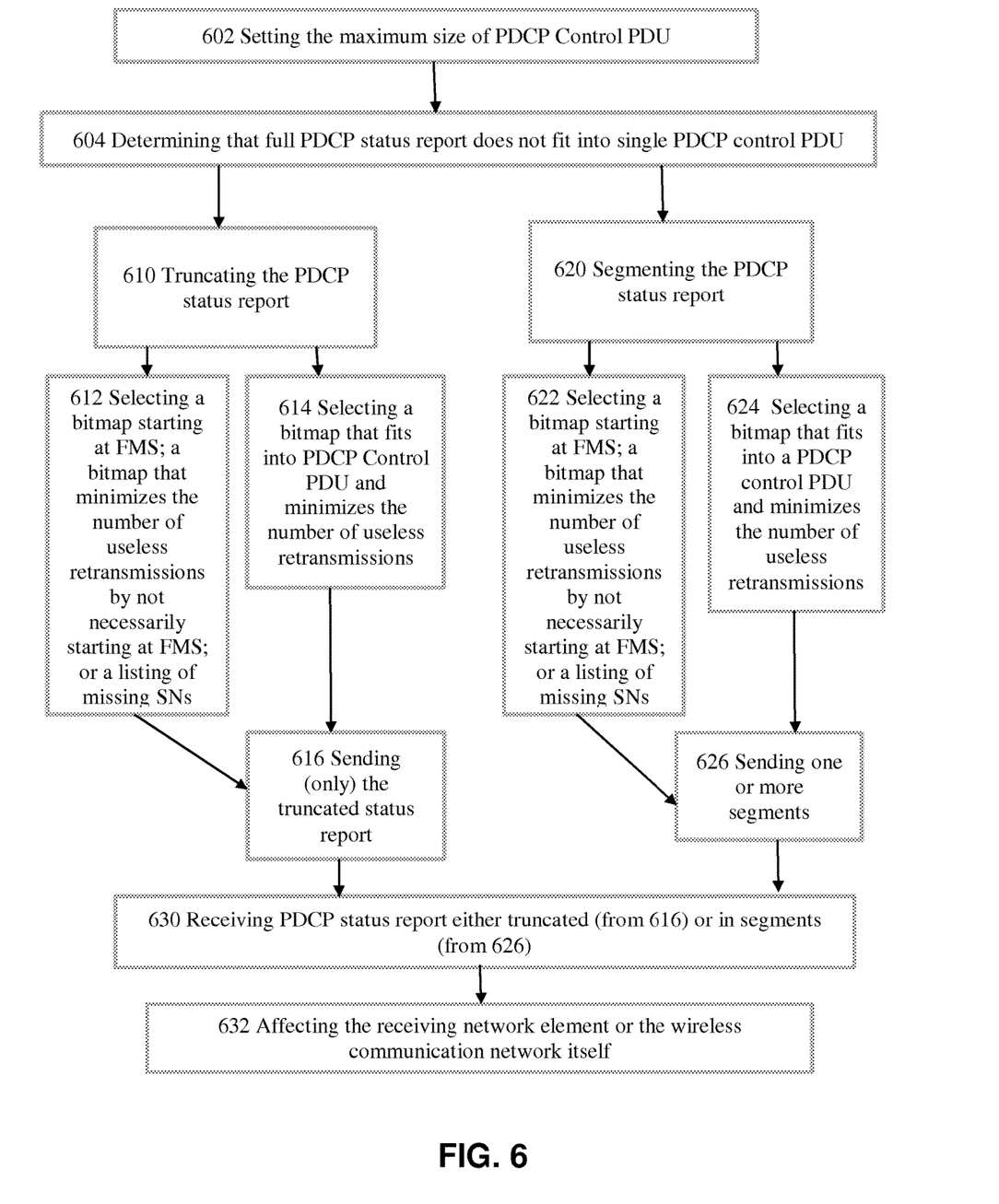
FIG. 6 is a logic flow diagram for enhancement of PDCP Status report (e.g., PDCP Control PDU for PDCP status report), and illustrates the operation of an exemplary method, a result of execution of computer program instructions embodied on a computer readable memory, functions performed by logic implemented in hardware, and/or interconnected means for performing functions in accordance with exemplary embodiments.

FIG. 6 is a logic flow diagram for Enhancement of PDCP Status reports. This figure further illustrates the operation of an exemplary method, a result of execution of computer program instructions embodied on a computer readable memory, functions performed by logic implemented in hardware, and/or interconnected means for performing functions in accordance with exemplary embodiments.

For instance, the YYY module 140 may include multiples ones of the blocks in FIG. 6, where each included block is an interconnected means for performing the function in the block. The blocks in FIG. 6 are assumed to be performed by the UE 110, e.g., under control of the YYY module 140 at least in part.

Or for instance, the ZZZ module 150 may include multiples ones of the blocks in FIG. 6, where each included block is an interconnected means for performing the function in the block. The blocks in FIG. 6 are assumed to be performed by a base station such as eNB 170, e.g., under control of the ZZZ module 150 at least in part.

Without in any way limiting the scope, interpretation, or application of the claims appearing below, a technical effect of one or more of the exemplary embodiments disclosed herein is to minimize the Status report size as discussed in Options 1 and 2 below. Another technical effect of one or more of the exemplary embodiments disclosed herein is that segments of the Status report can be received earlier as discussed in Option 3 below. Another technical effect of one or more of the exemplary embodiments disclosed herein is limiting the size of the control PDU to a configurable maximum size as discussed in Options 4 and 5 below.

Embodiments herein may be implemented in software (executed by one or more processors), hardware (e.g., an application specific integrated circuit), or a combination of software and hardware. In an example of an embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

Since Rel-8 and up to the time of the current invention, PDCP Status Reports (or Status PDUs) are exchanged between the receiver of PDCP PDUs and the transmitter of PDCP PDUs. For very high data rates, the transmitter of PDCP PDUs is typically an eNB and the receiver is a UE, but it may as well be vice versa. For very high data rates, the transmitter of status reports is typically a UE but it may as well be the eNB. The status reports are exchanged between the UE and the eNB in order to minimize the occurrence of duplicates over the air interface after a reset or re-establishment of RLC, for example, at handover.

Higher data rates for LTE are being standardized in 3GPP. Carrier aggregation (CA) is being extended to 32 component carriers (CC). The higher data rate requires a longer PDCP sequence number (SN) length. RAN2 has decided to specify a new PDCP SN length in addition to the currently supported 15 bits. A 23-bit SN length has been proposed and tentatively agreed.

However, with a 23-bit (e.g., or 18-bit) SN the PDCP Control PDU format for the PDCP Status report would have to also be updated, namely, the FMS (First Missing PDCP SDU) field has to be extended to 23 bits (e.g., or 18 bits) and, if nothing is changed, also the maximum bitmap size is extended to $2^{22}$=4 194 304 bits or 524288 octets (or $2^{17}$=131072 or 16384 octets). As a result, the huge bitmap size of the PDCP Status report presents problems, for example, which include it being excessively large size over prior incarnations such that sending it over an air interface or an X2 interface would no longer be practical. Another related problem is that the PDCP status report would exceed the maximum defined PDCP data PDU size (8188 bytes).

Figure 2A:
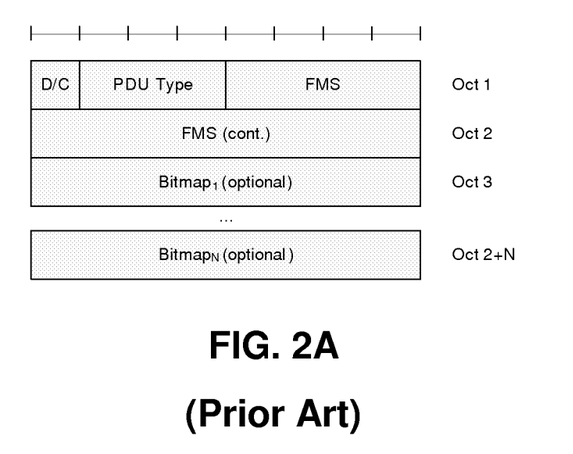
FIG. 2A and FIG. 2B are diagrams that show the format of the PDCP Control PDU carrying one PDCP status report when a 12 bit SN length is used is and when a 15 bit SN length is used, respectively.
Figure 2B:
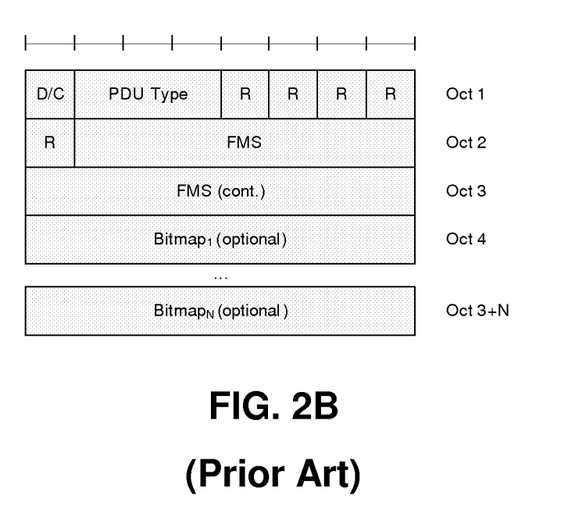

As noted above, PDCP Control PDU for PDCP status report is discussed in section 6.2.6 of 3GPP TS 36.323, where FIG. 6.2.6.1 shows the format of the PDCP Control PDU carrying one PDCP status report when a 12 bit SN length is used is, and where FIG. 6.2.6.2 shows the format of the PDCP Control PDU carrying one PDCP status report when a 15 bit SN length is used. This format is applicable for DRBs mapped on RLC AM. Herein, for convenience, FIGS. 6.2.6.1 and 6.2.6.2 have been reproduced as FIG. 2A and FIG. 2B, respectively.

As noted at the beginning of this application, this invention relates generally to PDCP Status Reports (or Status PDUs), which are exchanged between a UE and eNB and, more specifically, relates to the extension of the PDCP SN to 23 bits (e.g., or 18 bits). The need for a longer Sequence Number (SN) and hence a larger SN space of PDUs is necessary due to the use of higher data rates. Higher data rates may be enabled, for example, by larger amount of spectrum available for communications, by the use of higher order transmission techniques, by the use of wider transmission bandwidth or by the aggregation of a larger number of component carriers for a transmission.

Higher data rates may also be due to aggregating or integrating different access techniques for joint operation below the PDCP layer, as an example LTE Wi-Fi aggregation or LTE aggregation with a 5th generation access technique.

In order to limit the PDCP Status report size there are several ways to proceed, which are detailed in the options below.

Option 1 would be to introduce a status report, for example, by listing only the sequence numbers of the missing PDCP PDUs that have lower SN than that of the last received PDU, assuming that the bitmap in most cases would be quite sparse (in terms of PDUs indicated as missing, i.e., only a few 0's (zeros)). If only the missing sequence numbers would be listed, then the length of the bitmap would be lost and it would then be impossible for the receiver to know how many PDUs have been successfully received after the last missing SN (MS or NACK SN) indicated. So in addition to the missing SN(s), the last out-of-sequence PDCP SDU stored would have to be indicated, LRS (last correctly received SDU) in FIG. 3A. One possible embodiment could use instead of FMS (first missing PDCP PDU/SDU) field an NMS (Next Missing PDCP PDU/SDU) field. Then the assumption would be that all PDCP PDU/SDUs having SN lower than NMS and not listed in the PDCP status report are correctly received. FIG. 3B shows one possible embodiment.

Option 2 involves selection between a Bitmap versus NACK based PDCP status report that would be either configured by RRC or could be selected dynamically by the UE, where the UE could select the one that results into the shorter Status report.

Even with the above changes, a PDCP status report can still be very large in worst-case scenarios. For the full-length status report, it is feasible to segment the status report to smaller units, which requires a novel status report segmentation mechanism, while the legacy status reports do not exceed the largest data PDU size. Even more, novel means are needed to limit the status PDCP Control PDU and/or report size [to fragments], for the efficiency and practicality reasons. Option 3 describes where/how the segmentation of the status report at PDCP level would be beneficial. In this option, an eNB would get the first part of the status report much faster and could take the first content into account much earlier even if further information would come later. Although segmentation of the PDCP PDU at the RLC level is known, it comes with the shortcoming that all segments must be received before delivery to the receiving PDCP, thus, this Option 3 proposes a novel technique.

Alternatively, in Option 4, the maximum size of the PDCP status PDU or PDCP Control PDU could be limited (and could be configurable). Then the question becomes what to report if the size limitation does not allow the PDCP status report to describe a complete status of the receiver, i.e., all PDUs received and missing. Here for instance, reporting as many NACK_SNs that would fit and then reporting the next missing SN or reporting the first missing SN and then as many NACK_SNs that would fit. On the other hand, also the bitmap could simply be truncated at a maximum size.

Finally, Option 5 would be to simply limit the size of the status report to x bits. If the bitmap is used, then the UE would select the bitmap that minimizes the number of useless retransmissions in downlink, for example, by maximizing the entries set to '1' as currently specified and not simply cutting it abruptly. A useless retransmission is a retransmission of a PDU/SDU that has already been received correctly (but which cannot be indicated in the status report). Here minimizing the number of useless retransmissions simply means selecting such a bitmap that contains most of the correctly received SDUs. This technique would require indicating the starting position of the bitmap separately from the FMS, and making sure that higher-layer packet losses are avoided in the spirit of acknowledged-mode bearers, by specifying that the PDUs with SN between this starting position and the FMS would have to be implicitly assumed as not yet received.

For example using Option 5, if the following bitmap of 10 bits would be needed: 0000010111; but a limit of 5 bits is set, then the UE should send bitmap 0111 and indicate that the signaled bitmap starts after the $6^{th}$ position (counting from 1) of the original (full) bitmap. (The indicated $6^{th}$ position itself would be interpreted as a successfully received PDU, given that the PDUs with SN between this starting position and the FMS would have to be implicitly assumed as not yet received.)

Figure 3A:
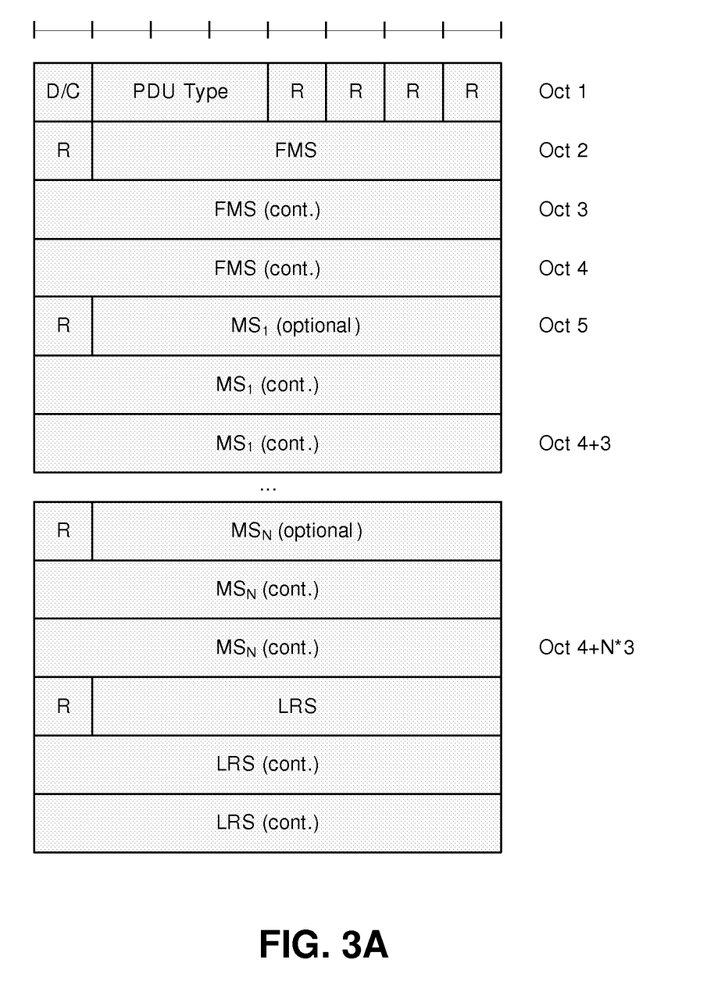
FIG. 3A and FIG. 3B are diagrams that show embodiments listing sequence numbers of the missing PDCP SDUs (MS)
Figure 3B:
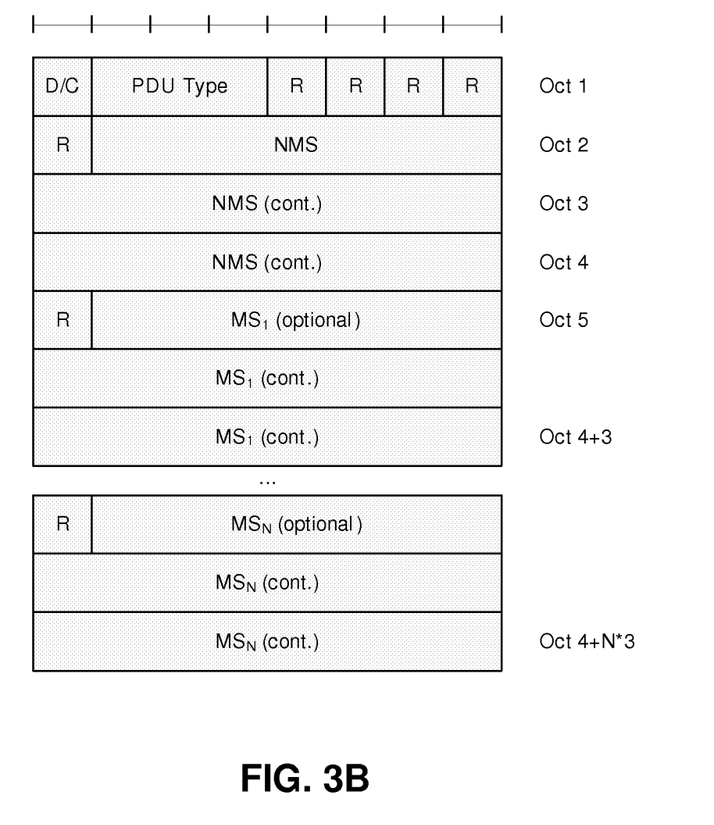

Turning to FIG. 3A and FIG. 3B, per Option 1, only the sequence numbers of the missing PDCP SDUs (MS) are listed.

Per Option 2, selection between this and legacy PDCP Status report can be done dynamically (by UE or eNB) based on which results into smaller status report. The UE can dynamically compare the length of the status report candidate formats and select the shorter or most convenient one. Any format decided by the UE is easily understandable by the receiving eNB due to the compatible but unique PDU formats invented herein. The format selection of a large PDU is very critical for the UE efficiency and performance, for example, in terms of transmission capacity, used (and available) transmit power and due to the uplink coverage limitations.

Per Option 3, segmentation of a PDCP Status report can be done, for instance, by taking two reserved (R) bits into use (there are currently 5 R bits unused in the PDCP Control PDU header) and using them to indicate whether the start (S) and end (E) point of the full status report are included into this message. S=1 indicates that it is the first segment, E=1 that it is the last segment. Then S=0 and E=0 indicates a 'middle' segment, S=1 and E=1 indicates full status report (no segmentation), S=1 and E=0 indicates first segment which is followed by another, S=0 and E=1 indicates the last segment (after one or more segments). Each segment would indicate the starting SN of that segment (FMS would be redefined to first missing SN in this segment) followed either by a bitmap or list of missing SNs (or alternatively a list of correctly received SNs), and in case of listing missing SNs, the last segment would have to end with or contain the highest-numbered PDU successfully received or alternatively the next missing PDU SN.

When segmentation is used, it should be specified whether the UE (always) sends all the segments or whether a (new) request mechanism is introduced for further segments. If segments which would follow are requested by the receiver, then it would be beneficial to indicate at the end of the segment how many correctly received PDUs remain whose SNs are outside of this segment, as shown in FIG. 4.

Figure 4:
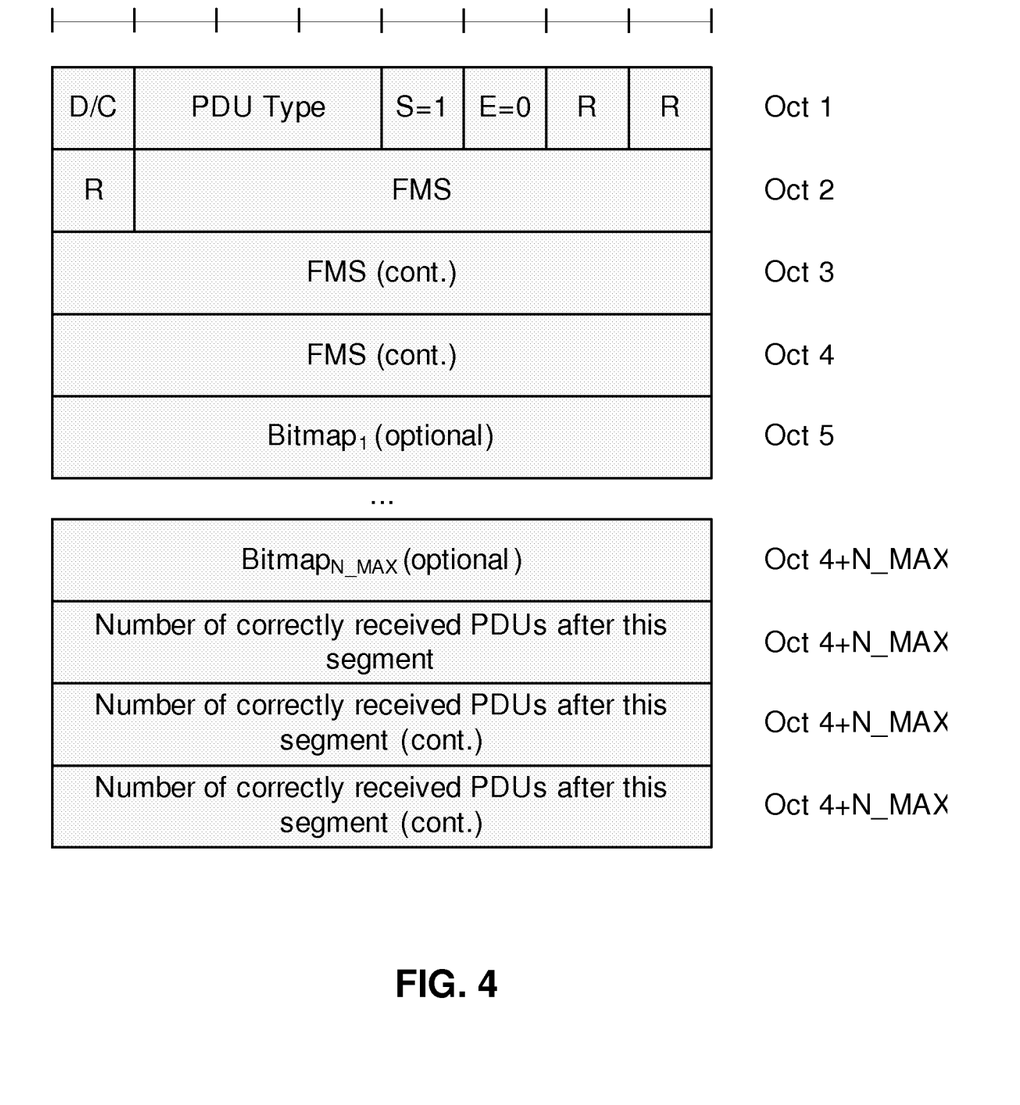
FIG. 4 is a diagram that shows how many correctly received PDUs remain whose SNs are outside of a segment.

In FIG. 4, it may be assumed that the transmitter side can start retransmitting the missing PDCP PDUs when it receives the PDCP Status report and at the same time request another segment of the PDCP Status report. This technique makes sense especially when there are so many retransmissions based on the first PDCP status report, that the next segment can be received before the PDUs covered by that next segment are being retransmitted.

However, according to the PDCP specification, the transmitter side can start retransmissions even without or before receiving the PDCP status report (the receiver can detect and discard duplicates). When the status report is received, the transmitter simply 'discards' the PDUs that are reported to be correctly received and continues to retransmit the missing ones. Thus, even with the PDCP status report there can be duplicate transmissions.

As an alternative example for DL data transmission, the UE would decide the format of the control PDU and signal it in the PDCP Control PDU for PDCP status report as described above. The eNB would know to what extent the UE would be able to acknowledge by its selected control PDU format and the eNB would also know how much data it has transmitted to the receiver window. Thus, the eNB can give a frequent uplink grant so that the UE can frequently deliver the subsequent 'segment PDUs' or segments of the status report, until the status report is complete.

Additionally, a defined UE functionality could be made that when the eNB grants uplink allocations, the UE shall continue acknowledging segments of its PDCP receiver window until the full window has been acknowledged. A less frequent uplink grant may cause the UE to select a more thorough (i.e., a longer) control PDU format for PDCP status report for a large number of PDCP PDUs in the receiver window. The eNB at the reception of the control PDU would recognize that the control PDU only contains a part of the status and consequently the eNB would need to give more uplink grants (despite the amount of uplink data there is to transmit). If the eNB is originally giving frequent uplink grants, there may be a smaller number of PDCP PDUs in the receiver window and UE may select another shorter (i.e., non-complete) control PDU format for the PDCP status report at the beginning. Any subsequent uplink grant may then result in the UE acknowledging the PDCP receiver window at an increased pace and hence catching up the window status by the resulting shorter control PDU formats. This would happen, for example, when the fractional status reports are 'requested' by frequent uplink grants hence having a short round-trip-time (RTT) and allowing the UE to include acknowledgements for a larger number of PDCP PDUs than get transmitted by the eNB in that same RTT.

This technique could be a request mechanism, but it would happen by the uplink grants and would be based on the eNB knowledge of (1) the UE selected control PDU format for a PDCP status report and (2) the eNBs knowledge of how large number of PDCP PDUs the UE was able to acknowledge in the most recent control PDU for PDCP status report versus the number of in-transit PDCP PDUs transmitted by the eNB.

Limiting the maximum size of the PDCP Control PDU for the PDCP status report per Option 4 can be done simply by cutting the 'full' report at a given point. It can be indicated in the header of the PDCP control PDU whether this is a truncated status report (a fragment) or full report or a segment of a full report, similar to segmentation. The recipient needs to know whether the report is a truncated report (that is not followed by other reports) or a segment which is followed by other segments. The indication of the number of correctly received PDUs with SNs after or outside the present control PDU for the PDCP status report could also be introduced for any truncated status report.

Figure 5:
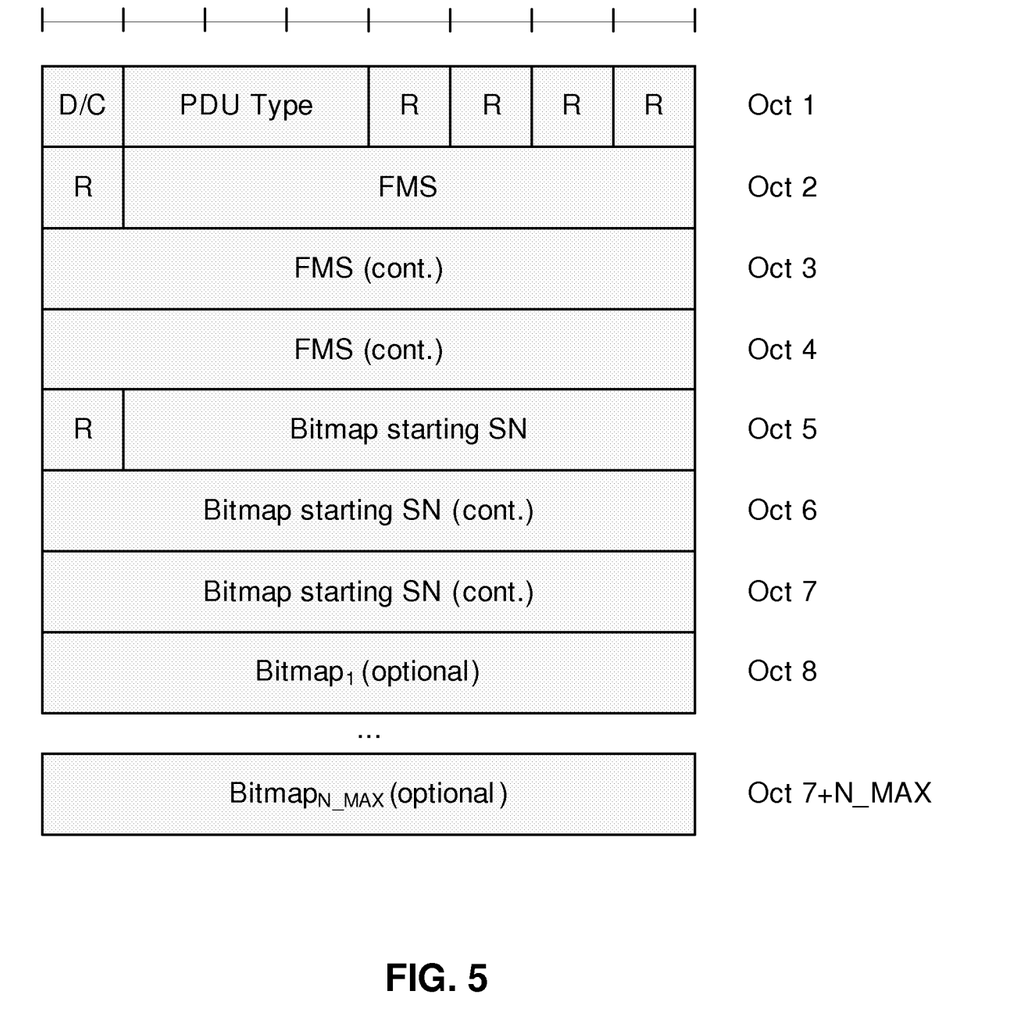
FIG. 5 is a diagram which shows the starting point of the bitmap as different from first missing SN.

Referring now to FIG. 5 which shows the starting point of the bitmap as different from first missing SN. If FMS is not the starting point of the bitmap per Option 5, the status report in addition to including FMS also has to include the starting point of the bitmap. Since the PDUs with SN between FMS and this starting point would have to be assumed to be missing, then this starting point SN would need to be specified to indicate a successfully received PDU, for the ultimate bitmap-length optimization.

If several different PDCP Control PDU formats for the PDCP status reports are defined, they can be indicated either by PDU Type field (there are currently 6 spare values) or by using the R bits.

Options 1 and 2 simply try to minimize the Status report size while Option 3 segments the Status report such that first part can be received earlier. An advantage of embodiments using Options 4 and 5 is that they limit the size of the PCDP control PDU for the PDCP status report to a configurable maximum size.

Turning now to FIG. 6 which is a logic flow diagram for enhancement of PDCP Status report (e.g., PDCP Control PDU for PDCP status report), and illustrates the operation of an exemplary method or exemplary methods, a result of execution of computer program instructions embodied on a computer readable memory, functions performed by logic implemented in hardware, and/or interconnected means for performing functions in accordance with exemplary embodiments.

Block 602 represents a step of the method wherein the size of the PDCP control PDU (see Option 4) is limited to a maximum size. Note that at this stage the size of the control PDU is limited, but not yet the size of the PDCP status report. Moreover, this could be done by configuration of the user equipment or by the user equipment receiving such a configuration command. For instance, the eNB could send such a configuration. Furthermore, this limitation to a maximum size still allows a degree of freedom below the given maximum limit.

A next step in the process can be represented by block 604 wherein it is determined that a full PDCP status report does not fit into a single PDCP control PDU. After that step, various approaches may be different possible outcomes in the specification which, once fixed, the network element, such as the user equipment, shall always follow, as opposed to being branches for selection in the logic followed by that network element.

After the step represented by block 604 it could be seen that the process breaks into two main alternatives, namely, the branch containing blocks 610, 612, 614, and 616 and the branch containing blocks 620, 622, 624, and 626.

Block 610 represents a step of truncating the PDCP status report, in essence limiting the size of the status report. The steps represented by blocks 612 and 614 define alternatives of how that truncation should happen. Further on and in conjunction with the step of block 610, only the truncated status report would be sent (see Option 4). Note, however that the sending step, represented by block 616, happens after building the status report/control PDU, namely, after the steps represented by blocks 612 and 614.

Block 612 shows that depending on which format is more efficient (reports more correctly received PDUs) select (see Option 2) one of the options specified as available: a bitmap starting at FMS; the bitmap that minimizes the number of useless retransmissions by not necessarily starting at FMS (in which case its starting position as indicated, see Option 5); or listing of missing SNs (see Option 1).

As an alternative to following the path of block 612, the next step could instead be represented by block 614 where without any choice for the format, using a bitmap that fits into the PDCP control PDU and minimizes the number of useless retransmissions (see Option 5).

With either of these alternatives the starting position of the bitmap would need to be indicated.

Rather than starting the path that begins with the step represented by block 610, the next step could be represented by block 620 which would be to segment the PDCP status report (see Option 3) and then, thereafter in the step represented by block 626, send one or several segments.

Block 622 represents the process of selecting (either for the complete PDCP status report or separately for each segment) one of the options specified and also depending upon which format is most efficient: a bitmap starting at FMS (for the complete status report); a bitmap that minimizes the number of useless retransmissions by not necessarily starting at FMS (in which case indicating its starting position, see Option 5); or listing missing SNs (see Option 1).

Rather than following the step of block 622, the step represented by block 624 could be chosen where such step would be without any choice for the format, using a bitmap that fits into a PDCP control PDU and minimizes the number of useless retransmissions (see Option 5).

Again with either of these alternatives the starting position of the bitmap would need to be indicated.

As can be seen from the various combinations of steps above, segmentation and truncation are alternatives, and bitmap and listing of SNs are alternatives for both. Moreover, Option 5 can also be applied for both.

Also note that in the step represented by block 630, without loss of generality, could refer to any particular network element that can perform the method, and is not necessarily about the eNB. Segments are received only from the process of the step represented by block 620. From the step represented by block 610 the truncated report is received (although it is true that even the truncated PDCP status report could still be segmented).

Regarding the step represented by block 632, tangible or physical actions or changes in the communications network that could occur as a result of when the PDCP control PDU containing (a part of) a PDCP status report is received could include one or several of the following actions: discarding/removing from the transmission buffer all PDCP SDUs/PDUs which are indicated as correctly received; retransmitting missing PDCP SDUs/PDUs; requesting new segment(s) of PDCP status report; and requesting new segment of PDCP status report if more than a threshold number of correctly received SDUs are missing from the status report. Note that these changes would also affect the transmitter of the part of the PDCP status report. For instance, the transmitter such as the UE would transmit the part of the PDCP status report, and then could receive retransmitted missing PDCP SDUs/PDUs in response to the eNB performing retransmitting the missing PDCP SDUs/PDUs.

Thus, we have developed the current invention, an example of an embodiment of which can be referred to as item 1, which is a method for the transmitter of the status report comprising limiting the maximum size of PDCP Control PDU; determining that full PDCP status report does not fit into single PDCP Control PDU; generating a partial PDCP status report; and sending PDCP Control PDU containing the partial PDCP status report.

Note that the transmitter of the status report can be one or more various network elements in a wireless communication network such as a UE, and/or an eNB, and/or some other device. Moreover, any of these various network elements could also be the receiver of a status report, such that network element would receive a PDCP Control PDU where the maximum size thereof is limited; it was determined that full PDCP status report would not fit into single PDCP Control PDU; a partial PDCP status report was generated; and so a PDCP Control PDU containing the partial PDCP status report was sent.

An example of a further embodiment, which can be referred to as item 2, is the method of item 1 wherein limiting can be via RRC configuration.

An example of a further embodiment, which can be referred to as item 3, is the method of item 1 wherein partial PDCP status report can be a truncated report.

An example of a further embodiment, which can be referred to as item 4, is the method of item 1 wherein partial PDCP status report can be a segment of (full or truncated) status report.

An example of a further embodiment, which can be referred to as item 5, is the method of items 1, 3, and 4 wherein partial status report can be based on list of missing SN.

An example of a further embodiment, which can be referred to as item 6, is the method of items 1, 3, and 4 wherein partial status report can be based on truncated bitmap.

An example of a further embodiment, which can be referred to as item 7, is the method of items 1, 3, and 4 wherein partial status report can be based on bitmap minimizing the number of useless transmissions wherein.

An example of another embodiment, which can be referred to as item 8, is method of item 7 wherein the starting point of the bitmap is indicated.

An example of another embodiment, which can be referred to as item 9, is the method of any of the previous enumerated embodiments above wherein PDCP control PDU containing partial PDCP status report also contains indication of the number of correctly received PDUs/SDUs/SNs following this partial status report and not reported in this control PDU.

An example of another embodiment of the present invention, which can be referred to as item 10, is an apparatus comprising means for performing the methods of any of the previous enumerated embodiments above.

An example of another embodiment of the present invention, which can be referred to as item 11, is an apparatus comprising at least one processor and at least one memory including computer program code, wherein the at least one memory and the computer code are configured, with the at least one processor, to cause the apparatus to at least perform the methods of any of the previous enumerated embodiments above.

An example of another embodiment of the present invention, which can be referred to as item 12, is a computer program product embodied on a non-transitory computer-readable medium in which a computer program is stored that, when being executed by a computer, is configured to provide instructions to control or carry out any of the methods enumerated in items 1-9 above.

An example of a further embodiment, which can be referred to as item 13, is a wireless communication system which includes the apparatus of item 10 and/or the apparatus of item 11.

In another example, a computer program comprises program code for executing a method according to any of items 1 to 9. A further example is the computer program according to this paragraph, wherein the computer program is a computer program product comprising a computer-readable medium bearing computer program code embodied therein for use with a computer.

Also, referring to any of the examples of embodiments where partial PDCP status report is distinct or discrete, and related to the description of the Next Missing Sequence Number (NMS) or similarly to a bitfield starting offset, further embodiments are possible which would allow leaving the SNs acknowledged by the previous control PDU and the next control PDU to have a gap of a number of not listed PDCP SNs, all of which become hence acknowledged as correctly received, when the two or more of the partial control PDUs are available in the receiver.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above.

It is also noted herein that while the above describes examples of embodiments of the invention, these descriptions should not be viewed in a limiting sense. Rather, there are several variations and modifications which may be made without departing from the scope of the present invention.

Embodiments of the present invention may be implemented in software, hardware, application logic, or a combination of software, hardware, and application logic. The software, application logic and/or hardware may reside on any of the elements described in FIG. 1 or on some other device not pictured for example. If desired, part of the software, application logic and/or hardware may reside on any of the elements described in FIG. 1 or on some other device not pictured for example, part of the software, application logic and/or hardware may reside on any of the elements described in FIG. 1 or on some other device not pictured for example, and part of the software, application logic and/or hardware may reside on modules not depicted herein or on any combination of modules which would permit the performance of the invention.

Any of the examples of embodiments above can be performed by the use of an apparatus of, wherein a processor comprises at least one memory that contains executable instructions that if executed by the processor cause the apparatus to perform any of the various items described above.

Such an apparatus can comprise one or more processors and one or more memories that include computer program code. The one or more memories and the computer program code can be configured, with the one or more processors, to cause the apparatus to perform at least any of the various items described above.

Moreover, the invention can be practiced by a computer program product comprising a computer-readable storage medium bearing computer program code embodied therein for use with a computer, the computer program code comprising code for performing any of the various items described above.

A computer program, comprising code for performing any of the various items described above when the computer program is run on a processor.

If desired, the different functions discussed herein may be performed in a different order and/or concurrently with each other. Furthermore, if desired, one or more of the above-described functions may be optional or may be combined.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

3GPP Third Generation Partnership Project
ACK Acknowledgement
AM Acknowledged Mode
DRB Data Radio Bearer
eNB (or eNodeB) evolved Node B (e.g., an LTE base station)
FMS First Missing Segment/SDU/SN
GPRS General Packet Radio Service
GTP GPRS Tunneling Protocol
I/F interface
LTE long term evolution
MAC Medium Access Control
MME mobility management entity
MS Missing SDU/SN
NACK Negative acknowledgement
NCE network control element
NMS Next Missing SDU/SN
N/W network
oct octet
PDCP Packet Data Convergence Protocol
PDU Protocol Data Unit
PHY physical layer
RAN2 3GPP Technical Specification Group RAN, working group 2
Rel-8 Release 8
RLC Radio Link Control
RRH remote radio head
RTT Round Trip Time
Rx receiver
SDU Service Data Unit
SGW serving gateway
SN Sequence Number
TS Technical Standard
Tx transmitter
UE user equipment (e.g., a wireless, typically mobile device)

What is claimed is:

1. A method, comprising:
   determining that a full packet data convergence protocol status report does not fit into a single packet data convergence protocol control protocol data unit;
   generating a partial packet data convergence protocol status report that fits into the single packet data convergence protocol control protocol data unit, wherein the partial packet data convergence protocol status report is based on a truncated bitmap or is based on a selected bitmap minimizing a number of useless retransmissions relative to other bitmaps that could have been selected, and wherein, in response to the partial packet data convergence protocol status report being based on the truncated or selected bitmap, a starting point of the bitmap is indicated in the packet data convergence protocol control protocol data unit for a packet data convergence protocol status report separately from a first missing packet data convergence protocol service data unit indication in the control protocol data unit; and sending the single packet data convergence protocol control protocol data unit containing the partial packet data convergence protocol status report.

2. The method of claim 1, wherein a maximum size of the single packet data convergence protocol control protocol data unit is configured via radio resource control configuration.

3. The method of claim 1, wherein the partial PDCP status report is a truncated report.

4. The method of claim 1, wherein the packet data convergence protocol control protocol data unit containing the partial packet data convergence protocol status report also contains an indication of a number of correctly received protocol data units or service data units or sequence numbers following this partial packet data convergence protocol status report and not reported in this control protocol data unit.

5. The method of claim 1, wherein the partial PDCP status report is a segment of a full or truncated status report.

6. An apparatus, comprising
at least one processor; and
at least one memory including computer program code, the at least one memory and the computer program code configured to, with the at least one processor, to cause the apparatus to at least to:
determine that a full packet data convergence protocol packet data convergence protocol status report does not fit into a single packet data convergence protocol control protocol data unit;
generate a partial packet data convergence protocol status report that fits into the single packet data convergence protocol control protocol data unit, wherein the partial packet data convergence protocol status report is based on a truncated bitmap or is based on a selected bitmap minimizing a number of useless retransmissions relative to other bitmaps that could have been selected, and wherein, in response to the partial packet data convergence protocol status report being based on the truncated or selected bitmap, a starting point of the bitmap is indicated in the packet data convergence protocol control protocol data unit for a packet data convergence protocol status report separately from a first missing packet data convergence protocol service data unit indication in the control protocol data unit; and
send the single packet data convergence protocol control protocol data unit containing the partial packet data convergence protocol status report.

7. The apparatus of claim 6, wherein a maximum size of the single packet data convergence protocol control protocol data unit is configured via radio resource control configuration.

8. The apparatus of claim 6, wherein the partial packet data convergence protocol status report is a truncated report.

9. The apparatus of claim 6, wherein the partial packet data convergence protocol status report is a segment of a full or truncated status report.

10. The apparatus of claim 6, wherein the packet data convergence protocol control protocol data unit containing the partial packet data convergence protocol status report also contains an indication of a number of correctly received protocol data units or service data units or sequence numbers following this partial packet data convergence protocol status report and not reported in this control protocol data unit.

11. An apparatus, comprising at least one processor and at least one memory including computer program code, the at least one memory and the computer program code configured to, with the at least one processor, to cause the apparatus to at least to:
receive a packet data convergence protocol control protocol data unit where a maximum size thereof is limited;
determine that the received packet data convergence protocol control protocol data unit contains a partial packet data convergence protocol status report instead of a complete packet data convergence protocol status report, wherein the partial packet data convergence protocol status report is based on a truncated bitmap or is based on a selected bitmap minimizing a number of useless retransmissions relative to other bitmaps that could have been selected, and wherein, in response to the partial packet data convergence protocol status report being based on the truncated or selected bitmap, a starting point of the bitmap is indicated in the packet data convergence protocol control protocol data unit for a packet data convergence protocol status report separately from a first missing packet data convergence protocol service data unit indication in the control protocol data unit.

12. The apparatus of claim 11, wherein the maximum size of the packet data convergence protocol control protocol data unit is configured via radio resource control configuration.

13. The apparatus of claim 11, wherein the partial packet data convergence protocol status report is a truncated report.

14. The apparatus of claim 11, wherein the packet data convergence protocol control protocol data unit containing the partial packet data convergence protocol status report also contains an indication of a number of correctly received protocol data units or service data units or sequence numbers following this partial packet data convergence protocol status report and not reported in this control protocol data unit.

15. The apparatus of claim 11, wherein the partial PDCP status report is a segment of a full or truncated status report.

16. A computer program product comprising a non-transitory computer-readable storage medium bearing computer program code embodied therein for use with a computer, the computer program code comprising:
code for determining that a full packet data convergence protocol status report does not fit into a single packet data convergence protocol control protocol data unit;
code for generating a partial packet data convergence protocol status report that fits into the single packet data convergence protocol control protocol data unit, wherein the partial packet data convergence protocol status report is based on a truncated bitmap or is based on a selected bitmap minimizing a number of useless retransmissions relative to other bitmaps that could have been selected, and wherein, in response to the partial packet data convergence protocol status report being based on the truncated or selected bitmap, a starting point of the bitmap is indicated in the packet data convergence protocol control protocol data unit for a packet data convergence protocol status report separately from a first missing packet data convergence protocol service data unit indication in the control protocol data unit; and code for sending the single packet data convergence protocol control protocol data unit containing the partial packet data convergence protocol status report.

* * * * *